US009639460B1

(12) United States Patent
Karppanen

(10) Patent No.: US 9,639,460 B1
(45) Date of Patent: May 2, 2017

(54) EFFICIENT STRING FORMATTING

(71) Applicant: Amazon Technologies, Inc., Seattle, WA (US)

(72) Inventor: Jari Juhani Karppanen, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 20 days.

(21) Appl. No.: 14/575,779

(22) Filed: Dec. 18, 2014

(51) Int. Cl.
G06F 12/00 (2006.01)
G06F 12/02 (2006.01)

(52) U.S. Cl.
CPC .... *G06F 12/023* (2013.01); *G06F 2212/1016* (2013.01); *G06F 2212/1044* (2013.01)

(58) Field of Classification Search
CPC ........... G06F 12/023; G06F 2212/1016; G06F 2212/1044; G06F 17/2258; G06F 17/272; G06F 17/2247; G06F 9/544; G06F 9/52; Y10S 707/99942
See application file for complete search history.

(56) References Cited

U.S. PATENT DOCUMENTS 5,206,951 A * 4/1993 Khoyi ................. G06F 8/76 707/999.01
5,361,372 A * 11/1994 Rege ..................... H04L 12/433 370/229
6,993,540 B2 * 1/2006 Hudson ............... G06F 12/0269
7,178,100 B2 * 2/2007 Call ..................... G06F 17/2247 707/999.101
7,822,814 B2 * 10/2010 Bauman ............... H04L 69/162 709/204
2002/0143521 A1 * 10/2002 Call ..................... G06F 17/2247 704/1
2012/0331470 A1 * 12/2012 Jones ..................... G06F 9/544 718/102
2016/0062954 A1 * 3/2016 Ruff ....................... G06F 17/21 715/249

* cited by examiner

*Primary Examiner* — Matthew Bradley
*Assistant Examiner* — Francisco Grullon
(74) *Attorney, Agent, or Firm* — Davis Wright Tremaine LLP

(57) ABSTRACT

A system and method for providing a print formatted string wherein a format object is created for a format string a format string having a set of format specifiers, an amount of memory to allocate to a string buffer for the format object is determined, and the determined amount of memory is allocated to the string buffer. For each set of parameter values received with the format object, where each parameter value corresponds to a format specifier in the format string, a determination is made whether the determined amount of memory for the string buffer is sufficient to hold the set of input parameter values in accordance with the format string. If the determined amount of memory is insufficient, an amount of memory sufficient for the set of input parameter values in accordance with the format string is re-determined, and the string buffer is reallocated to the re-determined amount of memory.

21 Claims, 8 Drawing Sheets

EFFICIENT STRING FORMATTING

BACKGROUND

In various programming languages, output is often formatted using print formatted strings. However, because many of the input parameters represented by format placeholders have dynamic maximum lengths, such print formatted strings must often be parsed for specifiers each time they are used, which decreases performance. Similarly, for such print formatted strings, memory for string buffers configured to hold the output string are often allocated and reallocated for each use of the print formatted string, resulting in poor memory management, and, again, decreased performance.

BRIEF DESCRIPTION OF THE DRAWINGS

Various embodiments in accordance with the present disclosure will be described with reference to the drawings, in which.

DETAILED DESCRIPTION

Figure 1:
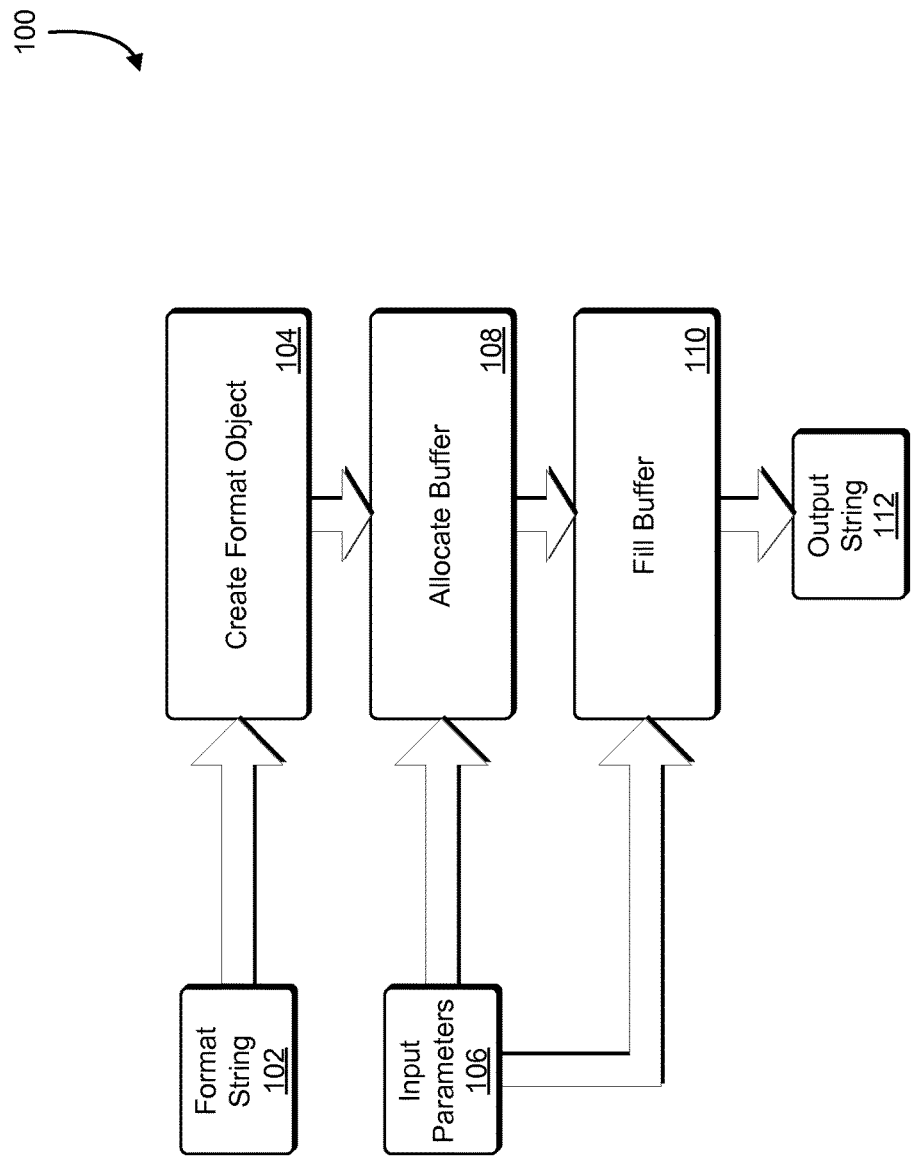
FIG. 1 illustrates an example of an embodiment of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested include a system and method for minimizing or avoiding dynamic memory reallocation when formatting strings. The system and method can be divided into three phases. The first phase (or specification phase) may involve creation of a format object, which may be an object configured to receive a pointer to a string buffer and may keep track of the format placeholders and offsets for parameters to be inserted into the string buffer. In this phase, a format string may be received and pre-parsed in a first order (e.g., beginning to end) to identify a set of format specifiers embedded within the format string.

As or after the format specifiers are identified, a determination may be made as to which format specifiers correspond to non-dynamic maximum length data types, also referred to as static length data types, and which format specifiers correspond to dynamic maximum length data types. In some examples, "non-dynamic length data types" or "static length data types" may refer to data types whose maximum lengths may be determined without prior knowledge of their values, such as integers with known maximum widths, single characters, and string literals. Conversely, in some examples, "dynamic maximum length data types" may refer to data types whose maximum lengths may not be determinable without prior knowledge of their values, such as strings, floating point numbers, and other data objects requiring further conversion before display). Because maximum lengths of the non-dynamic maximum length data types can be known, the required lengths for the placeholders for the non-dynamic maximum length data types may be predetermined, and, depending on the format string, some offset values may also be predetermined in this phase. Lengths for dynamic maximum length data types specified in the format string may be determined in a second phase after the format object has been created, however, in some implementations, default lengths may be determined for dynamic maximum length data types specified in the format string. In some implementations, memory may be pre-allocated to the string buffer in the specification phase; for example, if the format string does not contain any dynamic maximum length data types, the size of the string buffer may be determined in the specification phase and memory may be allocated to the string buffer at the determined size. Similarly, if their offsets are known, the string buffer may be pre-populated with any string literal values from the format string. At this stage, a format object for the format string may be provided.

In a second phase (or preformat phase), the format object may be received with a set of input parameter values corresponding to format specifiers in the format string. Once received, the set of input parameters may be traversed. In some embodiments, the set of input parameters are traversed in a second order (e.g., end to beginning) in this phase, which may allow the parameter values to be quickly retrieved from cache memory. As the input parameters are traversed, the input parameters corresponding to the dynamic maximum length data types identified in the specification phase are identified and their actual length may be computed in order to determine an amount of memory to allocate in the string buffer to allocate for insertion of the string-rendered parameter values. Note that in some embodiments, one or more of the set of input parameters may be processed (e.g., converted to strings, lengths determined, etc.) in parallel with other members of the set of input parameters to achieve further efficiency. Based on lengths of the dynamic maximum length data types computed in the preformat phase and the maximum fixed lengths of the non-dynamic maximum length data types determined in the specification phase, an amount of memory sufficient to render the output string may be allocated to the string buffer at this time, and offsets for the placeholders may be determined. In many cases, due to memory management granularity (e.g., 64 bytes, 128 bytes, or 256 bytes), the string buffer may be larger than actually needed on initial use. The extra buffer space provides room for the dynamic maximum length data types to grow without requiring that the string buffer be re-allocated. Additionally or alternatively, the extra buffer space may be used as temporary scratch space (e.g., for converting integers). In some implementations, the string buffer also may be pre-populated with the input values at this time. In some embodiments, the length of the string buffer may be provided as a result of the preformat phase.

In a third phase (or the format phase), the format object may be received with a set of input parameter values corresponding to format specifiers in the format string. As a string buffer sufficient to render the output string for the set of input parameter values was previously allocated in the preformat phase, in some cases during this phase, the input parameter values may be converted to strings and inserted into (i.e., written to) the string buffer at the locations specified by the determined offsets. Thereafter, the string buffer may be output to the output stream as a formatted string. In an event where the formatted string would exceed the length of the string buffer, the string buffer may be reallocated to a larger size, similar to the method described in the preformat phase. Alternatively, the format object may calculate and track a running average of required string lengths and a temporary string buffer may be allocated to hold unexpectedly large formatted strings (e.g., those that are in the 95$^{th}$ percentile of the strings formatted by the object, those that exceed a threshold amount above the average, etc.). In some embodiments the running average may be weighted.

The described and suggested techniques improve the field of computing, and specifically the field of print formatting, by improving the output speed of print formatted strings for dynamic-length variables. Additionally, the described and suggested techniques improve the functioning of computer systems by improving the output of human-readable text, output of serialized strings that follow specified formats, transaction logging, and generation of eXtensible Markup Language files and other markup language files. Moreover, the described and suggested techniques offer meaningful advantages over general string formatting methods by reducing the number of times the format string needs to be parsed and reducing the number of memory allocations that need to be performed, which provides a benefit in both efficiency and memory management.

FIG. 1 illustrates an aspect of an environment 100 in which an embodiment may be practiced. As illustrated by FIG. 1, the environment 100 may include a format string 102 which may be passed to a create format object component 104 that creates a format object to which input parameters 106 are provided, and allocate buffer component 108 allocates a corresponding string buffer to hold a formatted string. As noted, the present disclosure describes an efficient system for handling print formatted strings. The format string 102 may be any type of character string. In many cases, the format string may be written in a template language and embedded with format specifiers that indicate how to render the input parameters 106 into an output string 112. Non-format specifier characters in the format string 102 may be copied literally to the output string 112, while the input parameters 106 may be rendered in positions within the output string 112 corresponding to the format specifiers of the format string 102. Note that the examples of specifiers presented (e.g., "% c," "% d," "% s," etc.) are for illustrative purposes only, and the actual specifiers utilized in an embodiment for different data types may be any of a variety of string formatting conventions used by various programming languages, such as those used by C, C++, Python, etc. While examples herein may be based on particular language conventions (such as C and C++), the system of the present disclosure is not limited to those particular languages or conventions.

In some implementations, the format specifiers, may be introduced by a "%" character, however the system of the present disclosure may be configured to recognize format specifiers in different formats and/or introduced by different characters. However, the different format and/or different introductory characters may still allow the format specifier to be uniquely identified apart from non-specifier string literals in the format string 102. The format string 102 may be a string literal, may be the value of a string variable, and may or may not be encrypted, depending on the implementation. Note that other methods, besides format strings in template languages, for specifying placeholders and how values should be formatted as strings are contemplated. For example, an insertion operator (e.g., "<<") may be used to insert strings and placeholders into the format object. Similarly, the format object may be configured to accept specifiers and/or parameter values in a variety of ways. Collectively, these and other methods of specifying how to format parameters for a string may be referred to as a set of format directives.

The format string 102 may be provided to a create format object component 104 that creates the format object. The create format object component may be a function or object definition that, upon execution by a processor, causes the format object to be created. In the present disclosure, the create format object component may be referred to as "StringFormat." The create format object component may accept one or more parameters, including the format string 102. The format object may be a data object that is configured to hold one or more of pointers to one or more string buffers, and a list of placeholders/format specifiers for the string buffer and corresponding size requirements and/or offsets for the placeholders. The format object may also contain various information regarding the format specifiers within the format string 102, one or more lists of offsets indicating positions for placeholders in the string buffer for the contents of input parameters 106 corresponding to format specifiers in the format string 102, and any known maximum lengths of format placeholders corresponding to the format specifiers. The format object may also include other items such as a list of format instructions and flags, such as for specifying how to format fixed lengths data types and/or unknown length data types in the format string.

During the creation of the format object, the format string 102 may be parsed to identify the format specifiers and the string literals in the format string. For specifiers representing static length (i.e., non-dynamic) data types, such as decimals, characters, and fixed-length strings (e.g., "%15s"), a determination may be made as to how much memory in a string buffer should be allocated to the static length data type. Likewise, for string literals, because their length is known, a determination may also be made as to how much memory in the string buffer should be allocated to the string literal. For some of these static length data types and string literals, offsets for their positions in the string buffer may be determined at this time. In some implementations, the memory for the string buffer may be allocated at this time for the memory amounts that can be determined. However, the memory required for dynamic maximum length data types may not be determinable without knowing the values of the input parameters 106. That is, because dynamic maximum length data types may have a wide range of lengths or because they may have no defined limit to their length; that is, without having been provided a value, the maximum length of the input parameter when rendered to string may not be predeterminable. Thus, the amount to allocate to the string buffer for the dynamic maximum length data types may not be knowable from its specifier alone. In examples, "non-predeterminable maximum rendered string length" data types may refer to data types whose length may not be determined with certainty without their values. Conversely, in some examples, "predeterminable maximum rendered string length" data types may refer to data types whose maximum lengths may be determined without their values. Therefore, when the format object is created, memory corresponding to the specified dynamic maximum length data types may not be allocated to a string buffer or may be allocated a default amount of memory within the string buffer in the specification phase.

The input parameters 106 and the format object may be provided to the allocate buffer component, whereupon the allocate buffer component may determine, based on the values of the dynamic maximum length data type input parameters, how much memory should be allocated in the string buffer for the dynamic maximum length data types, static length data types, and string literals. When the amount of memory has been determined, the allocate buffer component may create a string buffer with the determined amount of memory, if the string buffer does not yet exist, or if the string buffer already exists, determine whether the existing string buffer needs to be reallocated with more memory. The allocated buffer component 108 may be a function that, upon execution by a processor, causes the string buffer to be allocated or reallocated to a sufficient size to contain the output string 112.

The fill buffer component 110 takes the values of the input parameters 106, converts them to strings, and inserts (i.e., writes) them into the string buffer of the format object allocated by the allocate buffer component. Thereafter, the contents of the string buffer may be output as the output string 112. In some embodiments, references to the input values (or, in the case of short data, such as integers, the values themselves) may be stored in the format object in the second phase. In such embodiments, the fill buffer component 110 may only receive the format object, which may provide a benefit of avoiding having to pass the input parameters again. The output string may be output on a standard output stream, but in some implementations other tasks may be performed by the fill buffer component 110 and/or other values may be output. The fill buffer component 110 may be a function that, upon execution by a processor, causes the string buffer to be filled with the contents of the input parameters 106 and outputs the output string 112. In embodiments of the present disclosure, the fill buffer component 110 may be referred to as "Format." Likewise, in some embodiments of the present disclosure, the allocate buffer component may be referred to as "Preformat." However, in other embodiments, the functionality of the allocate buffer component and the fill buffer component may both be served by the "Format" function.

As noted, the present disclosure describes a print format method that improves performance by minimizing memory reallocation for a string buffer and reducing the number of times format string needs to be parsed. This goal may be achieved by first pre-parsing the format string with a first component (e.g., StringFormat), which then holds a pre-parsed format specification. Thereafter, input variables may be passed to a second component (e.g., Format), along with the pre-parsed format specification, to generate the output. When the format string is pre-parsed by the first object, the input paths may be determined and an upper bound on the length of the formatted string may be determined or estimated.

For example, the maximum decimal number that may be expressed with a 32-bit integer is "4294967296." Therefore, if a 32-bit integer is to be passed to a "% d" placeholder, it may be known that there will be a maximum of ten digits for an unsigned 32-bit integer. Consequently, the maximum string length to express the decimal in formatted string may be known to be ten, for an unsigned 32-bit integer. Therefore, when the format string of "% d" is pre-parsed with the StringFormat object, 10 bytes of memory for the string buffer may be pre-allocated. However, in some embodiments, no pre-allocation may be performed by StringFormat, and the initial allocation may be performed by a second component, such as Preformat or Format.

In some cases, certain data types may have dynamic maximum lengths, such as strings ("% s"). Therefore, a given format string may comprise placeholders with known maximum lengths and placeholders that may be calculated each time the input parameters are received. Thus, for the present disclosure, when the input parameters are received, a determination is made as to the length of the output string and the size of the string buffer may be adjusted such that, going forward, reallocation of memory for the string buffer may be minimized.

Figure 2:
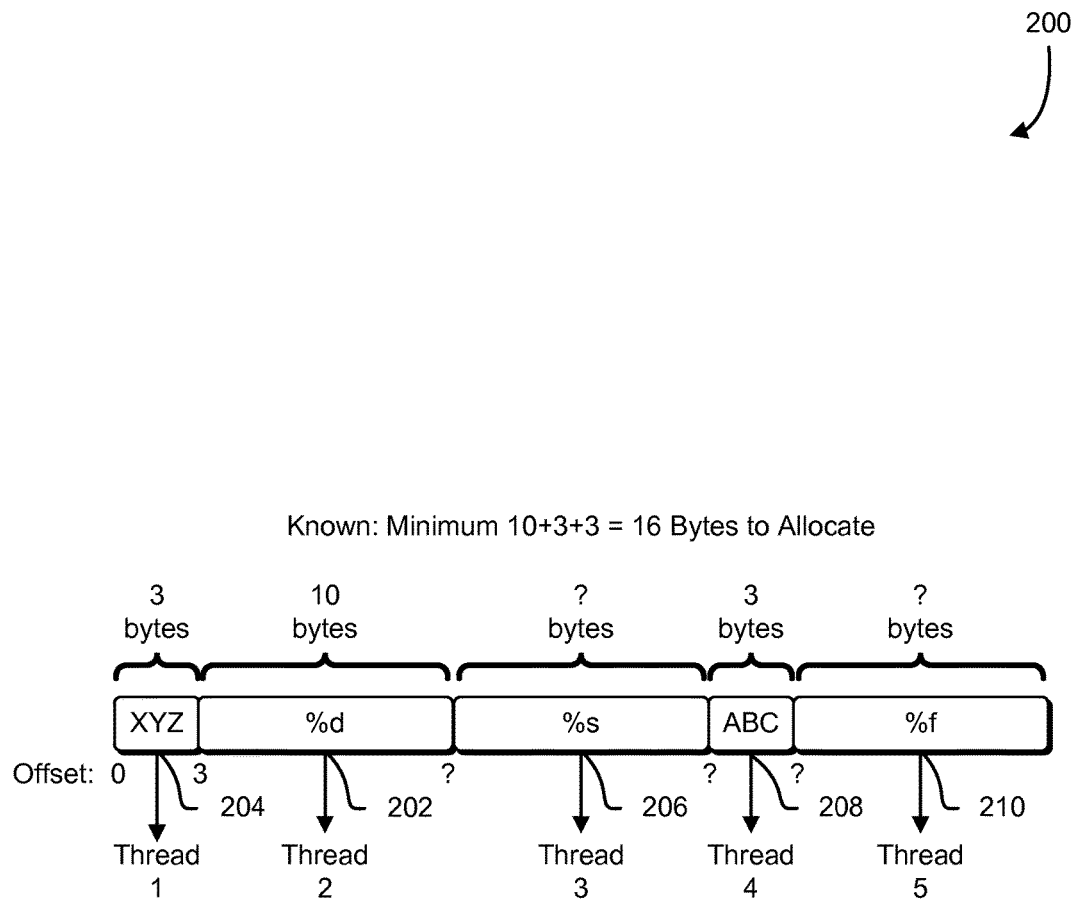
FIG. 2 illustrates an example of format object creation in accordance with an embodiment.

FIG. 2 illustrates an example 200 of an embodiment of the present disclosure. Specifically, FIG. 2 depicts memory allocation of a particular format string, ("XYZ % d % sABC % f") of a print format function, such as StringFormat, of the present disclosure. A format string may be written in a template language, comprising one or more format specifiers, which may specify where and how one or more parameters should be rendered into an output string. Note that a format string may be specified a manner other than a template language. For example:

StringFormat   fmt="XYZ"      <<      StringFormat:: Number1<int><<

StringFormat::String1<string><< "ABC" <<

StringFormat::Number2<float>;

The example format string, "XYZ % d % sABC % f" may be separated into a list of five parts 202-10. That is, "XYZ," appended by a number, appended by a string, appended by "ABC," and appended by a floating point number. In some embodiments, each of the separated parts may be processed concurrently by a different thread, thereby achieving a performance benefit through parallelization. Note too that the parts need not be actually separated; rather, in some implementation, pointers may be utilized to indicate the location of the parts within the format string.

The first part 204 is a static, three-character string, "XYZ." Because the first part 204 comprises three fixed characters, the number of bytes to be allocated to the first part 204 may be determined to be three. Note that determining amounts of bytes to allocate may be faster for data with a known maximum size, such as the second part 202 and the first part 204. Therefore, in some embodiments, adjacent data with known sizes may be grouped and processed within the same thread, rather than separately processed in different threads.

The second part 202 comprises the format specifier, "% d," indicating that it is a placeholder for a decimal number. The maximum size in bytes for an unsigned 32-bit decimal number may be determined to be ten, and therefore the number of bytes to be allocated to the second part 202 may be determined to be ten. Note while the number of characters to express a decimal may vary depending on the data type used (e.g., the minimum negative signed 32-bit integer may be eleven characters, a 16-bit unsigned integer may be expressed with five characters, and, in a case of a 64-bit signed or unsigned decimal number, may be 27 characters). However, a default number of bytes may be allocated for the decimal (e.g., ten), and, in an event where the number of characters exceed the default value, the allocation may be dynamically adjusted.

The third part 206 comprises the format specifier, "% s," indicating that it is a placeholder for a string data type. Because the actual value of the string may be not be known ahead of time, it may not be possible to determine the number of bytes that will be required by the third part 206. The fourth part 208 is another static three-character string, "ABC." Again, because the fourth part 208 comprises three fixed characters, the number of bytes to be allocated to the fourth part 208 may be determined to be three. Lastly, the fifth part 210 comprises the format specifier, "% f," indicating that it is a placeholder for a floating point number. Because the maximum size in bytes for the floating number may not be known ahead of time, it may not be possible to determine the number of bytes that will be required by the fifth part 210. However, in some cases a maximum number of bytes may be determined for floating point numbers based on the amount of precision specified (e.g., by the format specifier) for the floating point numbers.

Thus, in the example 200 of the present discloser, it may be determined that, in an allocated memory buffer, that the three bytes of the first part 204 may comprise bytes from 0-3of the buffer. However, although the maximum length of the second part 202 may be determined (e.g., ten bytes), the actual length may not be known until the actual value is passed; thus the offset for the string of the third part 206 may not be determinable at this stage. Likewise, because the actual lengths of the second part 202 and the third part 206 may be not be known ahead of time, the offsets for the fourth part 208 and the fifth part 210 may initially be indeterminate. However, because the maximum bytes required for the second part 202 is ten, the first part 204 is three, and the fourth part 208 is three, it may be determined that a minimum amount of memory to allocate to the format string is 16 bytes.

Figure 3:
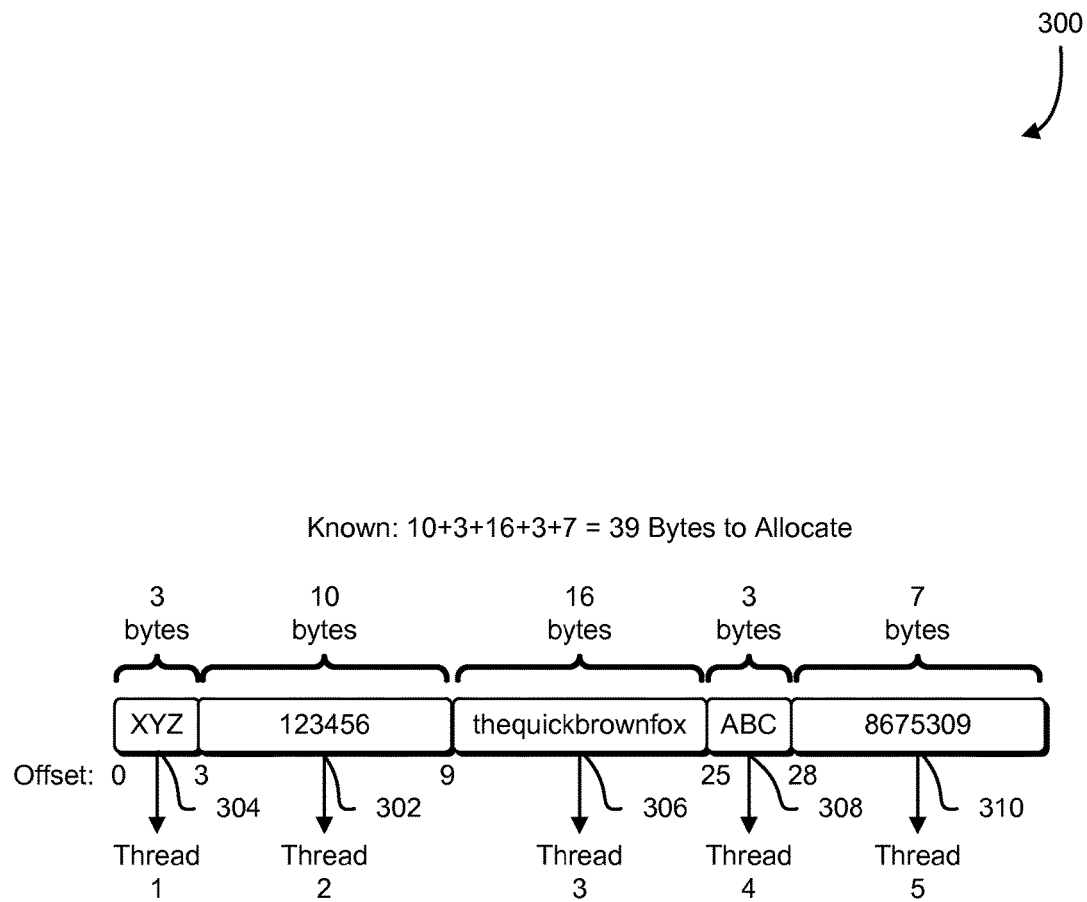
FIG. 3 illustrates an example of passing input parameters to a format object in accordance with an embodiment.

FIG. 3 illustrates an example 300 of an embodiment of the present disclosure. Specifically, FIG. 3 depicts memory allocation for the format string given in FIG. 2 of a print format function, such as Preformat or Format, after input parameters have been passed to the function. Note that the input parameters may be pointers to values or may be the values themselves, which may depend on the data type, which may get pushed to a stack. For example, if the data type is an integer, the value of the integer may be pushed to the stack, whereas if the data type is a string, a pointer to the string may be pushed to the stack.

In some embodiments, the input parameters at this stage may be traversed from the end to the beginning Because values may have been pushed to the stack in an order (e.g., beginning to end), the last items pushed to the stack are the most likely to still be in cache. Thus, traversing the stack from end to beginning may provide a performance benefit by accessing the most recent items from the stack first. Thus, traversing in reverse order, in FIG. 2, the size to reserve for the floating point placeholder for the fifth part 210 had been unknown. Note, in some environments, embodiments traversing from beginning to end may provide performance benefits, whereas in other embodiments, traversal order may have little or no performance benefit, in which case the embodiment may be configured to traverse in any order.

As shown in FIG. 3, an input parameter of "8675309" has been passed to the function to be inserted into a fifth part 310 of the output string at the location specified by the specifier "% f" in the fifth part 210 of FIG. 2. Therefore it may be determined that the fifth part 310 requires 7 bytes to express the value. The fourth part 308 still holds the fixed string, "ABC," and has been allocated three bytes. Similar to the floating point parameter, the contents of the dynamic string for the third part 206 were not known when pre-processing the format string of FIG. 2. However, in FIG. 3, it may be seen that the contents of the dynamic string now comprise, "thequickbrownfox" (e.g., 16 bytes).

Similarly, a first part 304 holds the fixed string, "XYZ," and has been allocated three bytes. Likewise, an input parameter of "123456" has been passed the function to be inserted into a second part 302 of the output string at the location specified by the specifier "% d" in the second part 202 of FIG. 2. Therefore, it may be determined that the actual size of the value is six bytes.

Once having been passed parameters for all placeholders, such as through a Preformat or Format function call, it may be determined that the total number of bytes to allocate to the string buffer is 3+10+16+3+7=39 bytes (note that, although the decimal value 123456 only uses 6 bytes, 10 bytes total have been allocated to the string buffer as a whole to accommodate a maximum integer value without needing to reallocate the string buffer). At this time, then, 39 bytes may be allocated to the print string buffer (35 bytes used, with 4 bytes unused). Note that in some cases, memory management granularity may not be 1 byte, but may be, rather some other unit, such as 64 bytes, 128 bytes, or 256 bytes. So, in such a case, the system of the present disclosure may attempt allocate memory to the print string buffer in amounts that match the memory management granularity. For example, in some embodiments, the system may query the memory manager for the actual usable block size (e.g., 64 bytes) and assign that length to the buffer (e.g., where memory management granularity is 64 bytes, 64 bytes rather than 39 bytes may be allocated to the print string buffer). Likewise, in the event that the print string requirement exceeds the allocated amount (65 bytes, for example, when 64 bytes have been allocated), the print string buffer may be allocated another block (or however many are required) of the appropriate granularity. Consequently, with the bytes of the dynamic parameters being known, the offsets may also be determined. For example, the offset for a fifth part 310 may be determined to be 35−7=28. The offset for a fourth part 308, which could not be determined in FIG. 2, may now be determined to be 28−3=25.

With the offsets determined, the values may be written to the buffer. In some embodiments, the input parameters at this stage may be traversed from the beginning to end (i.e., reverse of the order traversed in the previous stage) because the most recently-examined values are most likely to be still in cache. Thus, traversing the stack from beginning to end in this stage may provide a performance benefit by accessing the most recent items in cache first. Thus, in the example represented by FIG. 3, the string, "XYZ," may be inserted into (i.e., written to) the string buffer at offset 0. The string-formatted value 123456 may be inserted at offset 3. Then, the string, "thequickbrownfox," may be inserted at offset 9, the fixed string, "ABC," may be inserted at offset 25, and the floating point number, 8675309, may be converted to string and inserted at offset 28. Note that in some environments, embodiments traversing from end to beginning at this stage may provide performance benefits, whereas in other embodiments, traversal order may have little or no performance benefit, in which case the embodiment may be configured to traverse in any order.

Note that, besides alternating order of processing to retrieve most-recently accessed values from cache, other performance-enhancing variations are contemplated. For example, it may be beneficial to process the specifiers/placeholders in order of complexity, from least to greatest. For example, values which are short and less complex to render to string and determine byte count may require less memory and may be more likely to be found in cache than large value and/or complex string transformation. Processing tasks may be performed in parallel, and, in some cases, if processing less-complex values determines that reallocation is necessary, reallocation may be begun while the more complex processing is still being performed.

As noted for FIG. 2, the functionality may also utilize parallelization, which may provide a performance benefit. For example, processing the amount of memory needed for some or each of the parts 302-10 may be performed in separate threads. Note that in cases where memory management granularity is greater than 1 byte, the amount of memory allocated for the string buffer may exceed what is actually required by the format string. For example, in a case where memory management granularity is 64 bytes, the example 300 of FIG. 3 only requires 35 bytes, leaving 29 bytes unused. However, this unused space provides a benefit by providing a buffer to allow the amount of space allocated to each placeholder to increase up to the maximum permitted by the total allocated space without having to reallocate space for a larger buffer. In this way, memory and processing required to perform reallocations may be minimized. Additionally or alternatively, the unused bytes may be used as temporary scratch space for formatting integers or for other purposes.

Figure 5:
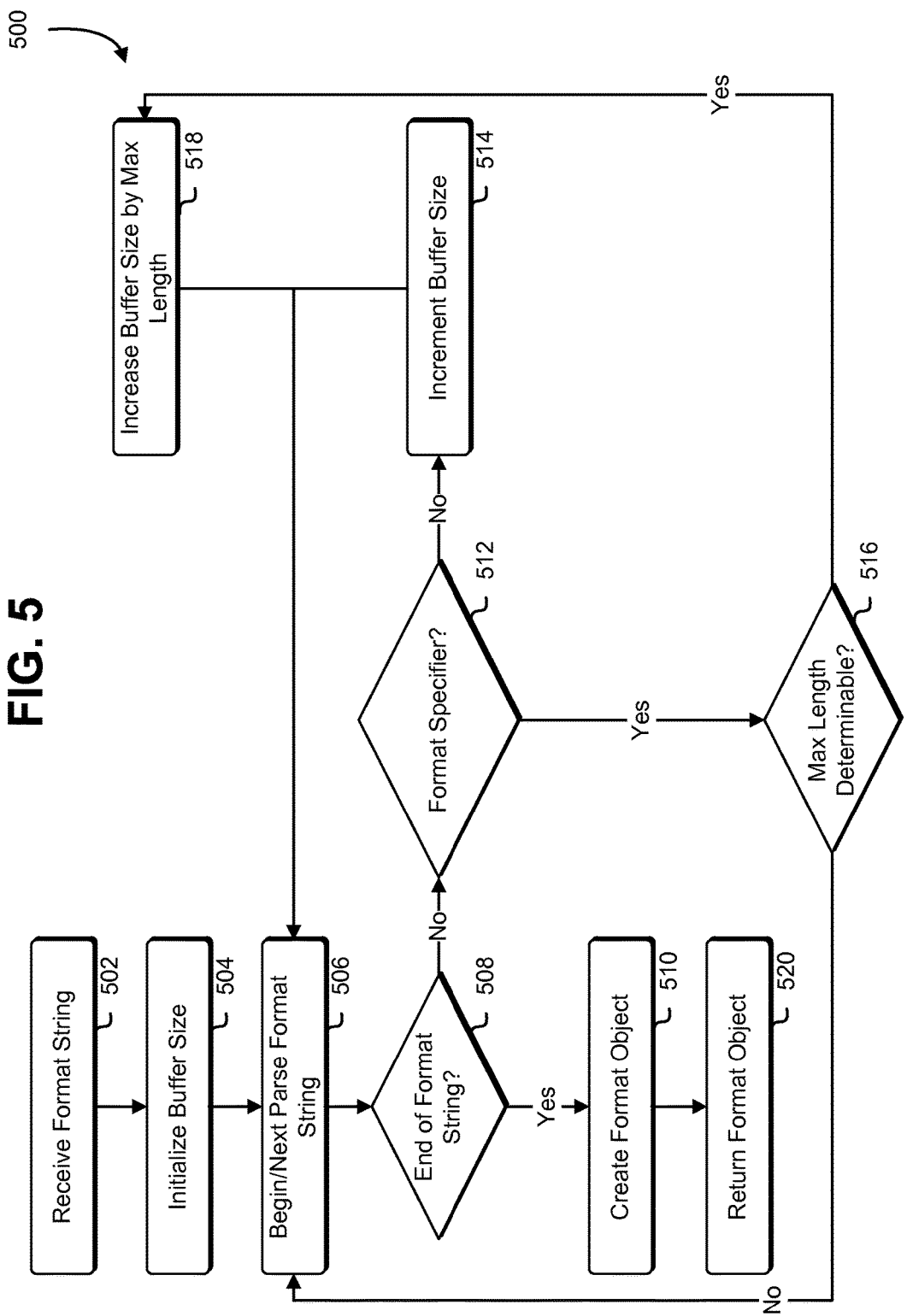
FIG. 5 is a flow chart that illustrates an example of creating a format object in accordance with an embodiment.
Figure 6:
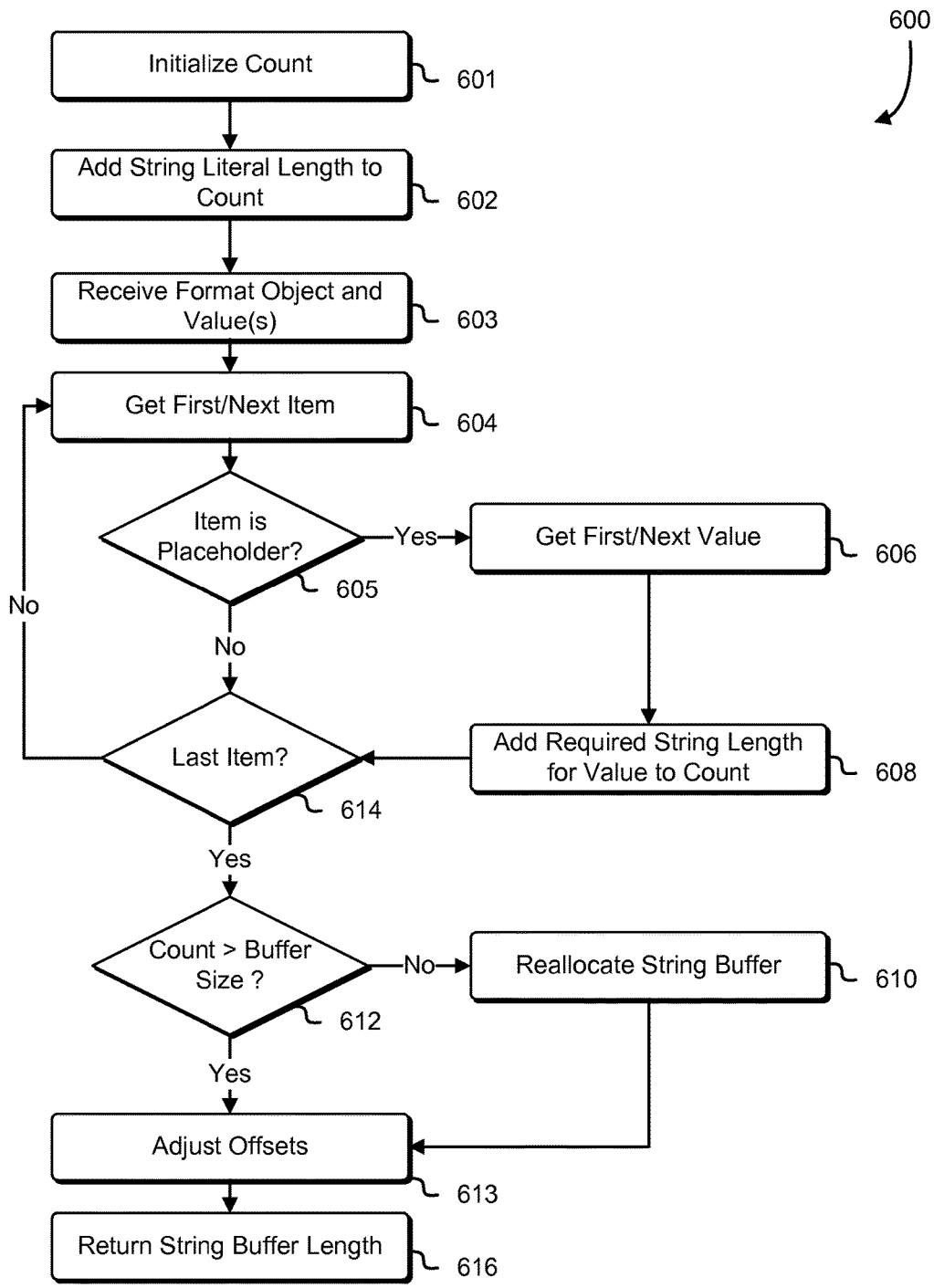
FIG. 6 is a flow chart that illustrates an example of performing a preformat of a format object with input parameters in accordance with an embodiment.
Figure 7:
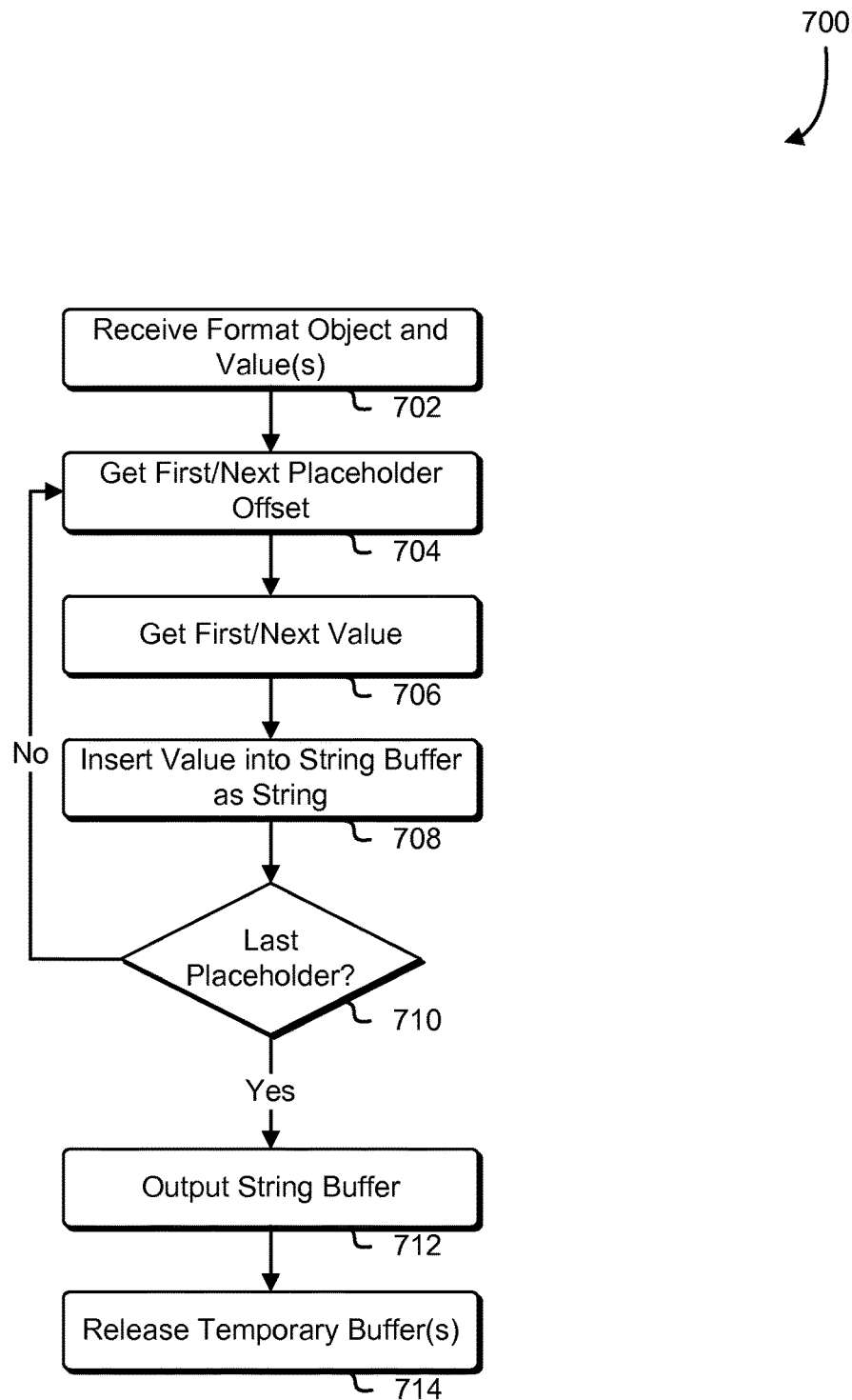
FIG. 7 is a flow chart that illustrates an example of outputting a print formatted string of a format object in accordance with an embodiment.

For each format string, a format object may be created once with StringFormat, illustrated by FIGS. 2 and 5, and thereafter a Preformat or Format call, as illustrated by FIGS. 3, 6, and 7 may be performed multiple times, as needed to generate the output string and/or reallocate memory to the string buffer as needed. In some embodiments, an amount of memory allocated to the string buffer of the format object may always be the maximum size sufficient to hold the largest output string since creation of the format object. For example, if the string for the third part 306 on a subsequent call of Preformat or Format, is "thequickbrownfoxjumpedoverthelazydog," the 39-byte string buffer may thereafter be increased to 59 bytes to accommodate larger string values (e.g., enough to hold the maximum string seen thus far).

Alternatively, in some embodiments, the format object may track a running and/or weighted average of the bytes required to allocate for the output string. In such embodiments, if a recent allocation deviated significantly from the average (e.g., average allocation being less than 64 bytes, but the last allocation was 512 bytes), on a subsequent call of a Preformat or Format function of the present embodiment, the string buffer may be trimmed (i.e., reallocated to a reduced size) in order to free memory. Whether an allocation deviates significantly from the average may be determined in various ways; for example, if the required buffer size exceeds the average required buffer size by more than a standard deviation. Alternatively, if an allocation deviates from the average, a temporary string buffer may be provided for an output string for the deviating parameters, and this temporary string buffer may be deleted or the allocated memory otherwise freed back to available memory after its string is output.

In some implementations, a Preformat function may be implemented to return the length of a string buffer necessary to hold the output string. In these embodiments, a Format function may be configured to reallocate the string buffer to the size indicated by the Preformat function in the event that the size is larger than currently allocated for the string buffer. In other implementations, the Preformat function may be configured to reallocate the string buffer of the format object, if needed, and determine the offset amounts. In such other implementations, the Format function may be utilized to insert the string-rendered parameter values (i.e., values converted to strings) at the specified offsets and such Format function may not include reallocation functionality. In still other embodiments, the Format function may incorporate the functionality of the Preformat function, and the preformat function may be unnecessary.

Figure 4:
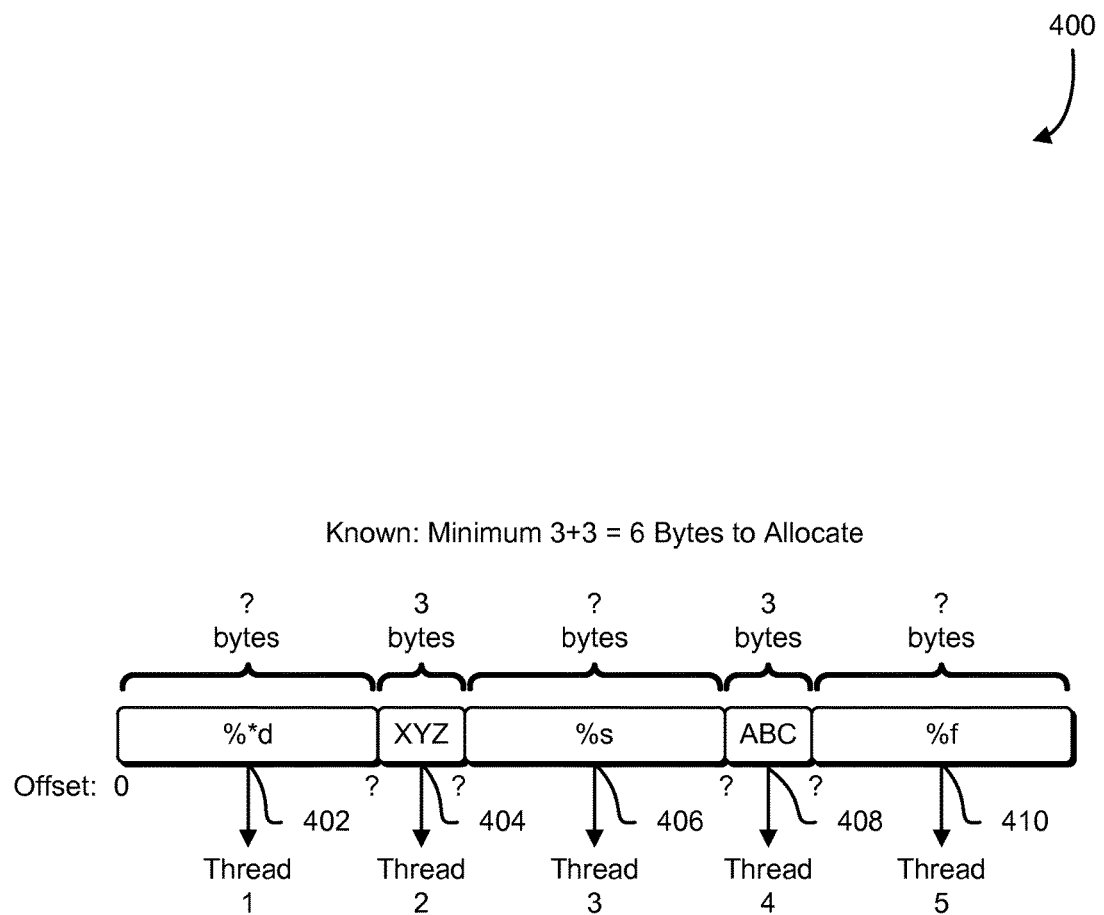
FIG. 4 illustrates an example of a format object with wildcard specifiers in accordance with an embodiment.

In some embodiments of the present disclosure, wildcard characters may be used in specifiers to indicate that an amount of memory should not be allocated for the placeholder until the parameter value is supplied. FIG. 4 illustrates an example 400 of such an embodiment, in contrast to the example 200 depicted in FIG. 2. Similar to FIGS. 2 and 3. FIG. 4 depicts memory allocation, having a first part 402, a second part 404, a third part 406, a fourth part 408, and a fifth part 410, for a format string of a print format function, such as Preformat or Format. As illustrated in FIG. 4, the specifier, "%*d," for the first part 402 may indicate, by the wildcard character "*," that the first part 402 should be considered dynamic. As a result, when the format object is created, such as by StringFormat, a maximum amount of memory to be allocated to the first part 402 may be left undetermined, Consequently, unlike in the example 200 depicted in FIG. 2, the offsets for the second part 404 may not be determined until actual values (or pointers to actual values) are provided, such as in the example 300 illustrated by FIG. 3.

In some embodiments, flags may be present within specifiers. For example, a flag may be used to force the sign of an integer value to be displayed for positive integers (e.g., "+"). In cases of specifiers with certain flags, the flags may affect the maximum size to be allocated in the buffer for the parameters corresponding to the flagged specifier. For example, a 32-bit integer, normally allocated a maximum width of 10 bytes, corresponding to a specifier with a sign flag (e.g., "%+d") may instead be allocated 11 bytes in the string buffer. As another example, a 32-bit integer corresponding to a specifier with a three-digit separator flag (e.g., "%,d") may be allocated 13 bytes in the string buffer (e.g., sufficient to represent "4,294,967,296" in the output string). Other possible flags include flags for left and right justification, padding with blank space before or after the value, specifying that the value is to be displayed in hexadecimal, binary, octal, or scientific notation format, and padding the value with preceding zeroes.

Note, in some embodiments, other data types and specifiers other than, "% d," "% i," "% s," "% c," and "% f," can be used. For example, a specifier of "% z" may indicate a placeholder for a compressed string. In such a case, the Preformat or Format function may be configured to decompress the compressed string—or otherwise retrieve a decompressed byte size from the compressed string—before the length of the output string (and string buffer) may be determined. As noted, alternate methods of providing specifiers to the format object are also contemplated, such as using the "<<" operator and/or using chained method calls (e.g., "fmt.length(10.base(octal).align(left)"). In some embodiments, a general object data type may be supported. For example, a specifier, such as "% o," may indicate a placeholder for an object of generally any type that may be rendered as a string. It is also contemplated as within the scope of the present disclosure that customized specifiers may be supported. For example, specifiers (e.g., "% x1," "% x2," etc.) may be reserved to allow users to define their data types and how such data types should be formatted for string conversion. Such custom definitions for data types may be created and maintained in a separate file or function, such as a custom filter function. Depending on the embodiment, the data values corresponding to the custom and generic object specifiers may or may not be separately allocated a temporary string buffer instead of the string buffer used for other data types.

In some embodiments, the format object supports an interface function for providing the length of the string. In such embodiments, the provided length of the string can be taken into account when calculating the maximum length (i.e., how much space to allocate to the string buffer). Optionally in these embodiments, the interface function can allow for providing how much temporary space is needed for performing the string conversions, and the temporary space needed can be taken into account when calculating the maximum length (if the buffer is large enough). In this manner, some dynamic allocation operations may be avoided.

As noted, in some embodiments, references to filter functions may be passed to the format object via the format string or other parameter. One example for a filter function may be an encryption or decryption function that may encrypt or decrypt the values passed before formatting them in a string. Other examples of filter functions include filter functions for encrypting the values passed, bit shuffling to rearrange bytes (e.g. little-endian to big-endian, big-endian to little-endian, etc.). In some implementations, filter functions may be functions created by users of the system of the present disclosure and configured to be called by including user-definable specifiers within the format string.

FIG. 5 is a flow chart illustrating an example of a process 500 for a StringFormat function call in accordance with various embodiments. The process 500 may be performed by any suitable system such as a server in a data center, multiple computing devices in a distributed system of a computing resource service provider, or any electronic client device such as the electronic client device 902 described in conjunction with FIG. 9. The process 500 includes a series of operations wherein a format string is received, parsed, and an initial buffer size is determined for a string buffer.

In 502, a format string may be passed to the process 500 for the StringFormat function call. Although the function is referred to by the name "StringFormat" in the present disclosure, the name of the function may be any name. In addition, as noted, the format string may comprise any combination of fixed characters and strings and/or format specifiers (also known as format placeholders). One example of a format string is "XYZ % d % sABC % f" of FIG. 2. Using this example format string, a format object may be declared and initialized similar to:

StringFormat fmt ("XYZ % d % sABC % f");

Where fmt is the format object. Another example of a format string may be, "Hello %15s. The temperature outside is %3d degrees Fahrenheit, or %3.1f degrees Celsius.\n," where "\n" may be an escape sequence for a new line. The specifier "%15s" may indicate that the string to be inserted in place of the string placeholder should be formatted to have a length of 15 characters. The specifier, "%3d" may indicate that the value to replace the decimal placeholder should be formatted to have a width of three digits. Likewise, the specifier, "%3.1f," may indicate that the value to replace the float placeholder should be formatted to comprise three digits, with one of the digits being after the decimal place. Examples of format specifiers include "% d" for decimal, "% c" for character, "% f" for floating point, "% s" for string, and "%%" for a percent character. Examples of escape sequences include, but are not limited to "\n" for new line, "\t" for tab, "\v" for vertical tab, "\f" for new page, "\b" for backspace, and "\r" for carriage return.

In 504, the variable for calculating the buffer size may initialized to zero and in 506, the system performing the process 500 may begin parsing each character of the format string. Note that in the present disclosure, the system performing the process 500 may be described as parsing the format string from right to left; however, it is contemplated that in other implementations, different parsing orders may be performed. In 508, a determination is made whether the parsing has reached the end of the format string; e.g., if the position of within the format string being parsed is at the end of the format string or equal to the size of the format string. If so, the system performing the process 500 may abort parsing and jump to 510. Note too, that in 508, the size of the format string may be checked and, if the size of the format string is zero (e.g., empty string), the system performing the process 500 may also jump to 510.

Otherwise, if characters remain to be parsed in the format string, the system performing the process 500 may proceed to 512, whereupon a determination is made whether the current position within the format string is a format specifier or a fixed (e.g., static) character. For example, a "%" at the present position may indicate the presence of a format specifier. Although not shown, a "\" and a subsequent character may indicate the presence of an escape code, and the escape code may be considered a fixed character. Similarly, a "%" in the present position and a "%" in the next position may indicate a fixed "%" character. All other characters may be considered fixed characters. Consequently, if the current position in the format string being parsed indicates a fixed character, the system performing the process 500 may proceed to 514, whereupon the variable indicating the number of bytes to be allocated to the string buffer may be incremented by one.

Otherwise, the present position within the string being parsed indicates a format specifier, then the system performing the process 500 may proceed to 516, whereupon it may be determined whether an amount in memory that should be allocated to the placeholder is determinable. Certain data types may have a fixed maximum size. For example, a character, which may be indicated by "% c," or some other formatting directive/instruction indicating a character, may be known to have a size of one byte. Likewise, a decimal, which may be indicated by "% d," or some other formatting directive/instruction indicating an integer, may be known to have a maximum size of ten bytes. Similarly, in the example above, a format specifier of "%15s" for a string may be known to have a maximum length of 15 bytes. As noted, in various embodiments, the format specifiers may be provided using different language constructions other than parsing a string. Similarly, maximum lengths for data types may be specified using different language constructions; for example:

FormatSpec<<
Format::Integer(Format::BITS_32).Length(20).Align
 (Format::L eft)

Alternatively, in some embodiments, the format object is configured to receive a list of directives and the length determination operations of 514 and 518 may be performed as a separate last step or loop rather than calculating lengths while parsing specifiers. In some embodiments, if the amount of memory that should be allocated to the placeholder is indeterminable, such as if the format specifier does not have a known maximum size, the system performing the process 500 may return to 506 to parse to the next character or format specifier in the format string. That is, although the maximum size for the current placeholder may be unknown, the system may continue parsing to determine a minimum amount for characters and format specifiers with known maximum sizes.

Alternatively, in some embodiments, a default size based on the data type indicated by the format specifier may be utilized for determining an amount to increase the buffer. For example, a data type of string, indicated by "% s," or some other formatting directive/instruction indicating a string, may be allocated a size of 64 bytes for the string placeholder, which may be later increased or decreased by a Preformat or Format function call to a more suitable size, should the default size be inadequate. As another example, in some cases the default size for a placeholder of indeterminate size may be one, in which case the system performing the process 500 may proceed to 514 to increment the number of bytes to be allocated by one. Alternatively, in still other embodiments, if the amount of memory that should be allocated to the placeholder is indeterminable, the system performing the process 500 may terminate further parsing and proceed to 510.

However, if the data type indicated by the current format specifier has a determinable size, the system performing the process 500 may proceed to 518, whereupon the number of bytes to be allocated to the string buffer may be incremented by an amount equal to the fixed maximum size of the data type indicated by the format specifier. Thereafter, the system performing the process 500 may return to 506 to parse to the next character or specifier in the format string. In 510, the format object may be created. The format object may be configured to receive and hold one or more of a pointer to the string buffer, the format string, a list of format specifiers within the format string, offsets for format placeholders within the string buffer, known maximum lengths of the format placeholders, computed buffer sizes, and maximum lengths for the format placeholders. The format object may also include other items such as a list of formatting directives, for fixed lengths data types and/or unknown length data types. Thus, string buffer sizes, known maximum lengths of static length data types and string literals, and determined offsets may be stored in the format object. In some implementations, the string buffer for the format string may be pre-allocated to a minimum size determined by the process 500. In some embodiments, the format object can contain the input values (e.g., as copies of the input values, pointers/references to the input values, etc.). In such embodiments, the StringFormat, Preformat, and Format function calls described in the present disclosure may be combined into a single function call that receives the input values to the format object.

Then, in 520, the StringFormat function may terminate and return, as a result of the function call, a format object having a buffer of the size allocated in 510. Various alternative values may be returned as a result of performing the StringFormat function call, depending on the particular implementation. For example, the return value may be the length of the buffer or a pointer to the buffer. In some implementations, the return value may be an array of buffer objects where each buffer of the array represents a particular placeholder or series of fixed characters. For example, the example 200, when processed by the system performing the process 500 may return an array of five buffer objects. Note that it is contemplated that one or more of the operations performed in 502-20 may be performed in various orders and combinations, including in parallel. For example, the format string may be split (e.g., split at any occurrence of a "%" character in the format string) into an array of format strings, and each member of the array may be processed in a parallel thread from the other members.

FIG. 6 is a flow chart illustrating an example of a process 600 for a Preformat function call in accordance with various embodiments. The process 600 may be performed by any suitable system such as a server in a data center, multiple computing devices in a distributed system of a computing resource service provider, or any electronic client device such as the electronic client device 902 described in conjunction with FIG. 9. The process 600 includes a series of operations wherein a format object and values for a format string are received, the—string buffer size for the format object is adjusted if necessary, and the buffer size is returned.

In 601, a temporary byte count for the amount of bytes required to render the parameter values and string literals to string may be initialized (e.g., set to zero). The length of the string literals may have been determined when the format object was created (per the operations of 514 of FIG. 5), and as such, in 602, the determined string literal lengths may be added to the temporary byte count and need not be recalculated. In some embodiments, the string literals of the format string may be stored within the format object. In 603, a format object, such as may be generated by StringFormat in the process 500 of FIG. 5, and one or more values may be passed to the process 600 for the Preformat function call. Although the function described by the process 600 is referred to by the name "Preformat" in the present disclosure, the name of the function may be any name. In some embodiments, the Preformat function may additionally receive a pointer to a string buffer. In other embodiments, the Preformat function may output a pointer to a string buffer allocated by the Format object. In this manner, the same format object (and consequently the same format string) may be used for one or more different string buffers. Using the example format string of "% dXYZ % sABC % f," a Preformat call may take a form similar to:

len=Preformat (fmt, int, str, val);

Where fmt represents a format object, int represents a decimal value, str represents a string value, val represents a floating point value, and len receives a value representing the size of format object in bytes. In 604, the first item corresponding to either a string literal or parameter of the format string may be determined. In the example format string of "% dXYZ % sABC % f," the first item would correspond to "% d."

In 605, the system performing the process 600 may determine whether the first/next item is associated with a placeholder. In the above example, the items "% d," "% s," and "% f" correspond to placeholders in the string buffer. For those items, the system performing the process 600 may proceed to 606, whereupon the first parameter value may be retrieved. In the example above, this value is represented by the variable int. Note that operations for placeholder items, 606-08 may be performed in separate threads for parallelization. In 608, the buffer size required by the value may be determined and added to the temporary byte count. The buffer size required may be determined in various ways, including by converting the value to a string and measuring the length of the string.

Otherwise, if the item is not associated with a placeholder (e.g., a string literal), in 614, a determination may be made whether all format specifiers in the format string have been examined. If not, the system performing the process 600 may return to 604 to get next item. Otherwise, if the last item has been examined, the system performing the process 600 may proceed to 612.

In 612, a determination is made whether the temporary buffer count exceeds the amount allocated for the string buffer. In cases where the temporary buffer count exceeds the string buffer size, or where the string buffer has not yet been allocated, the system performing the process 600 may proceed to 610 for the string buffer to be allocated or reallocated. For example, when the format object, fmt, was created, the maximum byte size of the string, str, to be substituted for the string placeholder may not have been known, and there may currently be no space—or insufficient space—in the string buffer to hold the string. In such a case, in 610, the string buffer may be increased (e.g., reallocated) by sufficient space to hold the string. For example, if str holds the string "Hello World!" and no space has currently been allocated in the format object, fmt, for the string placeholder, the string buffer may be reallocated to have an additional 12 bytes. Furthermore, because the string, str, is now known to be 12 bytes, the starting offset for the fixed string "ABC" may now be determined to be 12+13=25, and the starting offset for the float may now be determined to be 25+3=28.

In some embodiments, the format object may track running and/or weighted averages for the buffer sizes required by the placeholders. In such embodiments, if the current placeholder value is unusually large or small (e.g., exceeds a threshold amount over the average or other indication that the value is an outlier, etc.), the format object may be configured to allocate one or more separate temporary buffers for the outlier values. Furthermore, in some implementations, if the maximum byte size of the value is known, the system performing the process 600 may jump to the offset for the next placeholder value. For example, using the example format string, "% dXYZ % sABC % f,", the size of the decimal value was determined to be ten bytes. Thus, in 608, the system performing the process 600 may return to 606 to get the next placeholder value, represented by str, and its corresponding offset of 13.

In 613, offsets for the positions of the string literals and parameter values may be determined and set in the format object. In some implementations, the string literals may be pre-populated in the string buffer as well. In 616, the Preformat function having adjusted the buffer size of the format object if needed, may terminate and return the current length of the format string buffer. Note that one or more of the operations performed in 601-16 may be performed in various orders and combinations, including in parallel.

FIG. 7 is a flow chart illustrating an example of a process 700 for a Format function call in accordance with various embodiments. The process 700 may be performed by any suitable system such as a server in a data center, multiple computing devices in a distributed system of a computing resource service provider, or any electronic client device such as the electronic client device 902 described in conjunction with FIG. 9. The process 700 includes a series of operations wherein a format object and values for a format string are received, the values are converted to strings and inserted into the format string buffer in the designated locations, and the resulting string is output.

In 702, a format object, such as may be generated by StringFormat in the process 500 of FIG. 5, and one or more values may be passed to the process 700 for the Format function call. Although the function described by the process 700 is referred to by the name "Format" in the present disclosure, the name of the function may be any name. Note too, that in some embodiments, the functionality of the process 600 for the Preformat function call of FIG. 6 may be integrated into the process 700 and, in such an embodiment, the Preformat function call may not be implemented. Using the example format string of "% dXYZ % sABC % f,", a Format call may take a form similar to:

Format (fmt, int, str, val);

Where fmt represents a format object, int represents a decimal value, str represents a string value, and val represents a floating point value. In some implementations where a Preformat function call returns a required length of a string buffer but does not reallocate the string buffer of the format object, the Format call take a form similar to:

Format (fmt, len, int, str, val);

Where len represents the required size of the string buffer as may be returned by the process 600 of FIG. 6. Alternatively, in some embodiments the required length of the string buffer is stored in the format object itself, and in such embodiments an extra "len" parameter is not needed. In 704, the offset for the first placeholder may be determined. In the example format string of "% dXYZ % sABC % f" of FIG. 2, the offset for the first value, the decimal, is zero. In 706, the first parameter value may be retrieved. In the example above, this value is represented by the variable int. In 708, the first parameter value may be converted to string and inserted into the string buffer at the location of the retrieved offset in accordance with the formatting specified by the format specifier. Then, the system performing the process 700 proceeds to 710, whereupon a determination is made whether the current placeholder is the last placeholder in the format string. If further placeholders exist, the system performing the process 700 may return to 704 to move to the next placeholder offset, obtain its corresponding value, and insert the next placeholder value into the buffer at the appropriate location via the operations of 704-08.

Otherwise, if the last placeholder has been substituted, the system performing the process 700 proceeds to 712, whereupon the contents of the string buffer may be output as the output string. In some cases the string buffer may be output to a display or some other output string. In other cases, a pointer or handle to the string buffer or the contents of the string buffer may be returned to the caller for usage internal to software code. As still another example, the formatted string may be stored to a file or database. Furthermore, in some embodiments the operations in 712 may be begun at an earlier stage in the process 700. In these embodiments, the contents of the string buffer may be output before it is fully populated (e.g., between 708 and 710); for example, when the string buffer has been populated by a certain amount (e.g., 33%, 50%, 75%, etc.), the certain amount of the contents of the string buffer may be output to the caller or written to a file. Alternatively, a pointer to the partially-populated string buffer may be provided. And as other portions or the remainder of the string buffer are written, those portions too may be provided, such that the contents may be displayed or accessed while the string buffer is still being filled. Similarly, the rendered string values may be output or written to file as each parameter value or string literal is inserted into the buffer.

In some embodiments, there may be an additional set of operations 714, where, if one or more temporary string buffers had been created at an earlier stage (e.g., to hold an uncommonly large string), such temporary buffers may be deleted or released to free up memory. After the operations of 712 and 714, the Format function may terminate. Note that one or more of the operations performed in 702-14 may be performed in various orders and combinations, including in parallel.

Note that, unless otherwise specified, use of expressions regarding executable instructions (also referred to as code, applications, agents, etc.) performing operations that instructions do not ordinarily perform unaided (e.g., transmission of data, calculations, etc.) in the context of describing disclosed embodiments denote that the instructions are being executed by a machine, thereby causing the machine to perform the specified operations.

Figure 8:
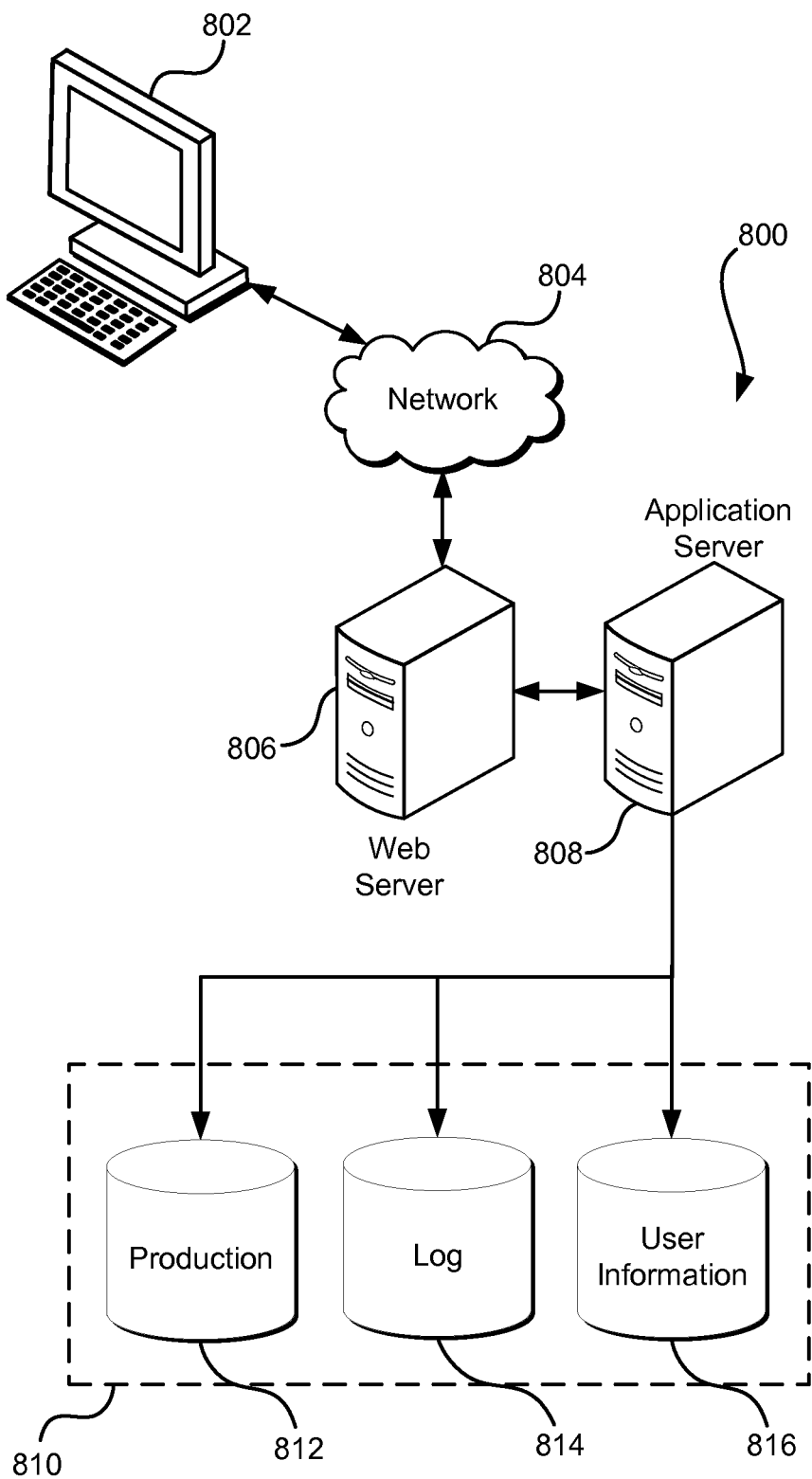
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other network and/or combination thereof. Components used for such a system can depend at least in part upon the type of network and/or environment selected. Protocols and components for communicating via such a network are well known and will not be discussed in detail. Communication over the network can be enabled by wired or wireless connections and combinations thereof. In this example, the network includes the Internet, as the environment includes a web server 806 for receiving requests and serving content in response thereto, although for other networks an alternative device serving a similar purpose could be used as would be apparent to one of ordinary skill in the art.

The illustrative environment includes an application server 808 and a data store 810. It should be understood that there could be several application servers, layers or other elements, processes or components, which may be chained or otherwise configured, which can interact to perform tasks such as obtaining data from an appropriate data store. Servers, as used, may be implemented in various ways, such as hardware devices or virtual computer systems. In some contexts, servers may refer to a programming module being executed on a computer system. As used, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), or another appropriate client-side structured language. Content transferred to a client device may be processed by the client device to provide the content in one or more forms including, forms that are perceptible to the user audibly, visually and/or through other senses including touch, taste, and/or smell. The handling of all requests and responses, as well as the delivery of content between the electronic client device 802 and the application server 808, can be handled by the web server using PHP: Hypertext Preprocessor ("PHP"), Python, Ruby, Perl, Java, HTML, XML, or another appropriate server-side structured language in this example. It should be understood that the web and application servers are not required and are merely example components, as structured code discussed can be executed on any appropriate device or host machine as discussed elsewhere. Further, operations described as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic or a combination of static and dynamic data in response to the received instructions. Dynamic data, such as data used in web logs (blogs), shopping applications, news services and other applications may be generated by server-side structured languages as described or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the electronic client device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the example environment 800 in FIG. 8 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize a network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, a central processing unit ("CPU" or "processor"), an input device (e.g., a mouse, keyboard, controller, touch screen or keypad), and an output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a wireless or wired network card, an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within a working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided, a person of ordinary skill in the art will appreciate other ways and/or methods to implement the various embodiments.

The specification and drawings are, accordingly, to be regarded in an illustrative rather than a restrictive sense. However, it will be evident that various modifications and changes may be made thereunto without departing from the broader spirit and scope of the invention as set forth in the claims.

Other variations are within the spirit of the present disclosure. Thus, while the techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a," "an," and "the" and similar referents in the context of describing the embodiments (especially in the context of the following claims) are to be construed to cover both the singular and the plural, unless otherwise indicated or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values are merely intended to serve as a shorthand method of referring individually to each separate value falling within the range, unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," is understood with the context as used in general to present that an item, term, etc., may be either A or B or C, or any nonempty subset of the set of A and B and C, unless specifically stated otherwise or otherwise clearly contradicted by context. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described can be performed in any suitable order unless otherwise indicated or otherwise clearly contradicted by context. Processes described (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising instructions executable by one or more processors. The computer-readable storage medium may be non-transitory.

The use of any examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

What is claimed is:

1. A computer-implemented method, comprising:
under the control of one or more computer systems that execute instructions,
in a first phase:
obtaining a format string written in a template language;
identifying:
a first format specifier from the format string, the first format specifier corresponding to a non-dynamic maximum length data type;
a second format specifier from the format string, the second format specifier corresponding to a dynamic maximum length data type; and
string literals from the format string;
computing:
a first memory amount for the first format specifier; and
a second memory amount corresponding to the string literal; and
providing a format object, the format object being a data object configured to:
hold a pointer to a string buffer; and
receive a set of input parameters;
in a second phase:
identifying, by traversing the set of input parameters received by the format object, an input parameter corresponding to the second format specifier;
computing, based at least in part on a value of the input parameter, a third memory amount;
based at least in part on the first memory amount, the second memory amount, and the third memory amount:
determining a total amount of memory to allocate to the string buffer; and
computing corresponding offsets for the string literal, the first format specifier, and the second format specifier; and
allocating the total amount of memory to the string buffer; and
in a third phase, for a plurality of first and second string-formatted values:

inserting into the string buffer corresponding to the pointer of the format object at the corresponding offsets:
a string literal value corresponding to the string literal;
a first string-formatted value corresponding to the first format specifier; and
a second string-formatted value corresponding to the second format specifier; and
performing an operation based at least in part on contents of the string buffer.

2. The computer-implemented method of claim 1, wherein:
the identifying is performed in a first direction;
the inserting is performed in the first direction; and
the traversing is performed in a second direction different from the first direction.

3. The computer-implemented method of claim 1, wherein the dynamic maximum length data types are one or more of strings, floating point numbers, and data objects requiring further conversion before display.

4. The computer-implemented method of claim 1, wherein the format string contains one or more format specifiers indicating how values of the input parameters should be rendered in the string buffer.

5. The computer-implemented method of claim 1, wherein computing the third memory amount includes:
computing a first required length of a first input parameter of the set of input parameters;
computing, in parallel with computing the first required length, a second required length of a second input parameter of the set of input parameters; and
computing the third memory amount based at least in part on the first required length and the second required length.

6. A system, comprising:
one or more processors; and
memory including instructions that, as a result of execution by the one or more processors, cause the system to:
obtain, a set of format directives with a set of format specifiers;
in a separate thread for each set of input parameter values of a first set of input parameter values, where individual parameter values of the first set of input parameter values correspond to specifiers in the set of format specifiers:
determine a first amount of memory to allocate to a string buffer for the set of format directives; and
allocate the first amount of memory to the string buffer; and
in a separate thread for each set of input parameter values of a second set of input parameter values; where individual parameter values of the second set of input parameter values correspond to the specifiers in the set of format specifiers:
determine whether the first amount of memory allocated to the string buffer is sufficient for the second set of input parameter values; and
on a condition that the first amount of memory is insufficient:
determine a second amount of memory sufficient for the second set of input parameter values; and
allocate the second amount of memory to the string buffer.

7. The system of claim 6, wherein instructions that cause the system to determine an amount of memory to allocate, further includes instructions that, when executed by the one or more processors, cause the system to determine an amount of memory to allocate to non-dynamic maximum length data types and string literals and determine an amount of memory to allocate to input parameters corresponding to dynamic maximum length data types.

8. The system of claim 6, wherein the instructions further include instructions that cause the system to:
determine a predetermined amount of memory to pre-allocate to the string buffer based at least in part on required lengths for format placeholders corresponding to non-dynamic maximum length data types, required lengths for string literals, and default lengths for dynamic maximum length data types specified in the set of format directives;
allocate the predetermined amount of memory to the string buffer; and
the instructions that cause the system to determine the first amount of memory further include instructions that determine a first amount of memory based at least in part on whether the predetermined amount of memory is insufficient for the first set of input parameter values.

9. The system of claim 6, wherein an unused portion of memory allocated to the string buffer is usable as temporary scratch space.

10. The system of claim 6, wherein:
the instructions further include instructions that cause the system to cause the system to track a weighted average of memory sufficient for the set of input parameters; and
the instructions that cause the system to reallocate the string buffer, include instructions that, when executed by the one or more processors, cause the system to allocate the second amount of memory to a temporary string buffer for the set of format directives and the set of input parameter values if the second amount of memory exceeds a threshold amount above the weighted average.

11. The system of claim 6, wherein instructions that cause the system to determine whether the first amount of memory is sufficient, further includes instructions that cause the system to determine, based at least in part on whether required lengths for placeholders corresponding to non-dynamic maximum length data types and string literals and required lengths for the set of input parameter values would exceed the first amount of memory.

12. The system of claim 6, wherein the instructions further include instructions that cause the system to create a format object for the set of format directives, wherein the format object receives a pointer to the string buffer.

13. The system of claim 6, wherein the instructions further include instructions that cause the system to:
convert the first set of input parameter values into a first set of strings;
write the first set of strings into the string buffer in accordance with the set of format directives;
convert the second set of input parameter values into a second set of strings;
write the second set of strings into the string buffer in accordance with the set of format directives; and
output the string buffer.

14. A non-transitory computer-readable storage medium having stored thereon executable instructions that, as a result of execution by one or more processors of a computer system, cause the computer system to at least:
parse a format string to identify a set of format specifiers;

identify, from the set of format specifiers, a first subset of format specifiers and a second subset of format specifiers, the first subset corresponding to placeholders for a first data type, the second subset corresponding to placeholders for a second data type;

in a first thread, determine, based at least in part on the first subset, a first amount of memory to allocate to a buffer of a data object for the format string;

in a second thread that executes in parallel with the first thread, determine, based at least in part on the second subset, a second amount of memory to allocate to the buffer;

allocate a total amount of memory to the buffer, the total amount based at least in part on the first amount of memory and the second amount of memory;

configure the data object to:
   hold a pointer to the buffer; and
   receive a set of input parameters corresponding to the set of format specifiers;

receive the set of input parameters into the data object;

convert the set of input parameters into a set of string-formatted values; and insert the set of string-formatted values into the buffer.

15. The non-transitory computer-readable storage medium of claim 14, wherein the executable instructions that determine a second amount of memory to allocate to the buffer further include executable instructions that cause the computer system, based at least in part on a format specifier of the set of format specifiers including a wildcard character, to determine, based at least in part on the value of an input parameter corresponding to the format specifier, the second amount of memory to allocate to the buffer for the format string.

16. The non-transitory computer-readable storage medium of claim 14, wherein the second data type is a compressed string data type and corresponds to a compressed string format specifier.

17. The non-transitory computer-readable storage medium of claim 14, wherein the executable instructions that cause the computer system to insert the values of the set of input parameters further include executable instructions that, when executed by the one or more processors, cause the computer system to insert the values of the set of input parameters as string-formatted values at locations in the buffer specified by a set of offset values for format placeholders corresponding to the set of input parameters.

18. The non-transitory computer-readable storage medium of claim 14, wherein the first data type is a data type with a predeterminable maximum rendered string length and the second data type is a data type with a non-predeterminable maximum rendered string length.

19. The non-transitory computer-readable storage medium of claim 14, wherein the first data type is a first dynamic maximum length data type with a first non-predeterminable maximum rendered string length and the second data type is a second data type with a second non-predeterminable maximum rendered string length.

20. The non-transitory computer-readable storage medium of claim 14, wherein:

the set of input parameters is a first set of input parameters; and the executable instructions further include executable instructions that cause the system to:
   determine, based at least in part on one or more values of a second set of input parameters corresponding to the second data type in the set of format specifiers, a third amount of memory to allocate to the buffer for the format string;
   determine that the total amount of memory is insufficient for the second set of input parameters; and
   allocate an amount of memory based at least in part on the first amount of memory and the third amount of memory to the buffer.

21. The non-transitory computer-readable storage medium of claim 14, wherein at least one specifier of the set of format specifiers includes a reference to a filter function that specifies how a parameter value corresponding to the at least one specifier is to be rendered in a formatted string.

* * * * *